(12) United States Patent
Hongo et al.

(10) Patent No.: US 8,184,160 B2
(45) Date of Patent: May 22, 2012

(54) IMAGE PROCESSOR, DRIVING ASSISTANCE SYSTEM, AND OUT-OF-POSITION DETECTING METHOD

(75) Inventors: Hitoshi Hongo, Shijonawate (JP); Kozo Okuda, Hirakata (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 1169 days.

(21) Appl. No.: 11/972,174

(22) Filed: Jan. 10, 2008

(65) Prior Publication Data

US 2008/0170122 A1 Jul. 17, 2008

(30) Foreign Application Priority Data

Jan. 11, 2007 (JP) ................................. 2007-003815

(51) Int. Cl.
*H04N 7/18* (2006.01)

(52) U.S. Cl. ........................................................ 348/148

(58) Field of Classification Search ........................ None
See application file for complete search history.

(56) References Cited

U.S. PATENT DOCUMENTS

| 7,502,048 | B2 * | 3/2009 | Okamoto et al. | ............. | 348/148 |
| 2003/0222983 | A1 * | 12/2003 | Nobori et al. | ................. | 348/148 |
| 2008/0199069 | A1 * | 8/2008 | Schick et al. | ................. | 382/154 |
| 2009/0169052 | A1 * | 7/2009 | Seki et al. | ..................... | 382/103 |

FOREIGN PATENT DOCUMENTS

| EP | 1150252 | * 10/2001 |
| JP | 2002-087160 | 3/2002 |

* cited by examiner

*Primary Examiner* — Ario Etienne
*Assistant Examiner* — Clayton R Williams
(74) *Attorney, Agent, or Firm* — Marvin A. Motsenbocker; MOTS Law, PLLC

(57) ABSTRACT

A driving assistance system that projects images imaged by multiple vehicle cameras onto a plane, and synthesizes projection images from images obtained at different times to accurately determine whether the vehicle cameras have moved out of their proper positions or imaging directions. The system includes: first and second in-vehicle cameras that capture first and second images, respectively. The cameras capture overlapping regions respectively in different directions. An image converter converts the first and second images into first and second projection images projected onto a plane. A solid object detection unit determines whether a solid object exists in the overlapping region. When no solid object exists, the images of the overlapping regions within the first and second projection images are compared to generate a comparison value. The comparison value is in turn compared with a threshold value for the determination of vehicle camera movement out of its proper position.

15 Claims, 13 Drawing Sheets

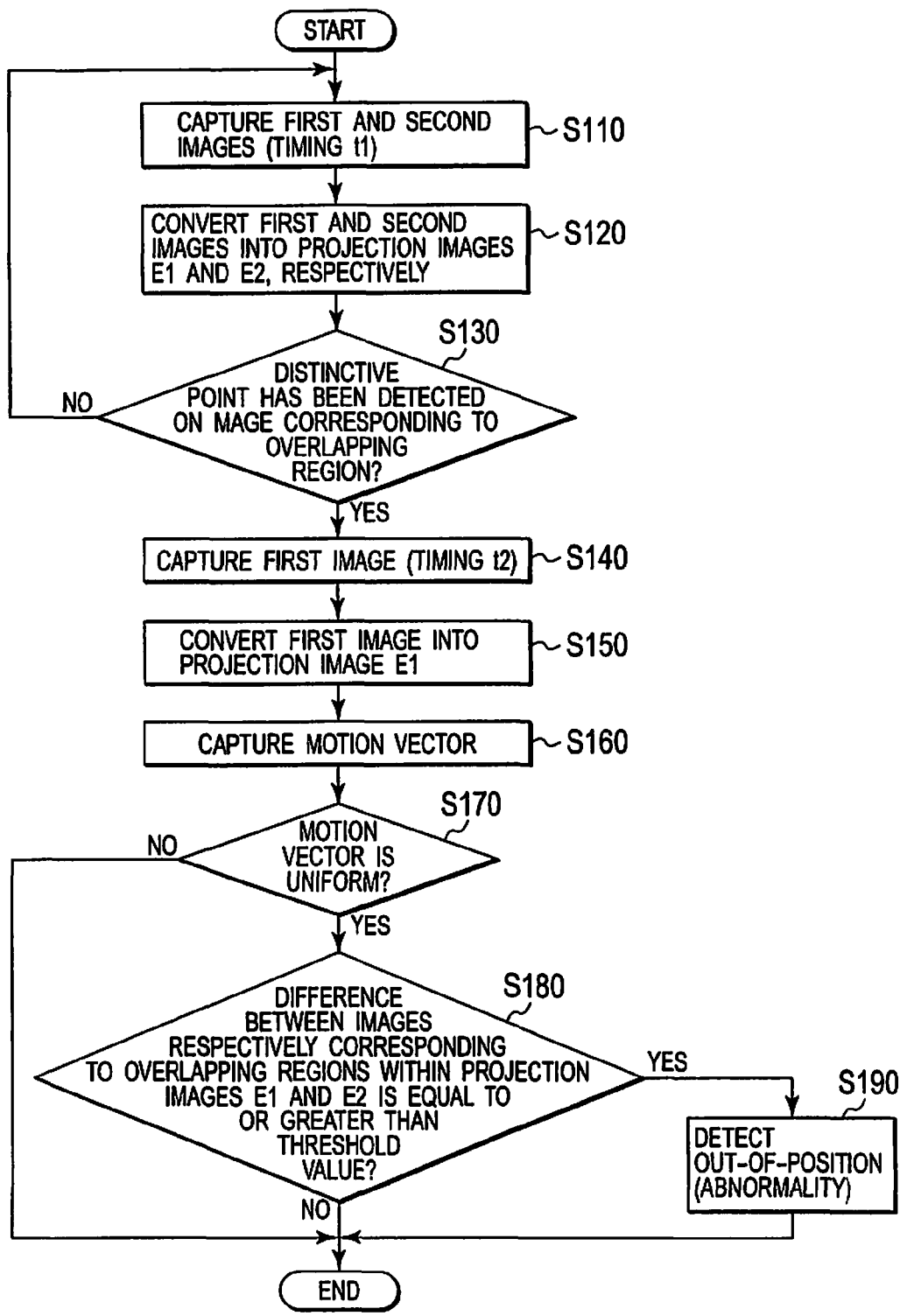

IMAGE PROCESSOR, DRIVING ASSISTANCE SYSTEM, AND OUT-OF-POSITION DETECTING METHOD

CROSS REFERENCE TO RELATED APPLICATIONS

This application claims priority based on 35 USC 119 from prior Japanese Patent Application No. P2007-003815 filed on Jan. 11, 2007, the entire contents of which are incorporated herein by reference.

BACKGROUND OF THE INVENTION

1. Field of the Invention

The present invention relates to a driving assistance system, an image processor, and an out-of-position detection method in which: peripheral views of a vehicle are imaged by a plurality of vehicle cameras; and a plurality of images thus imaged are converted into projection images projected on a plane while the projection images projected on the plane are synthesized to generate a synthesis image.

2. Description of Related Art

Heretofore, driving assistance systems to allow a driver of a vehicle or the like to monitor a peripheral situation of the vehicle have been disclosed, for example, in Japanese Patent Application Laid-open Publication No. 2002-87160. In this driving assistance system, a peripheral view of a vehicle is imaged using a plurality of vehicle cameras mounted on a periphery (e.g., on the left, right, front, and rear sides) of the vehicle, and images thus imaged are displayed on a display panel.

In such a driving assistance system, images produced by imaging a vehicle periphery are each converted into projection images projected on a plane (e.g., ground or the like). Further, a plurality of converted projection images are synthesized so that a synthesis image (a peripheral bird's-eye image) showing a vehicle viewed from an imaginary point in the sky is generated, and displayed on a display panel. Accordingly, the driver can check at a glance the situation around the vehicle from the synthesis image displayed on the display panel. In addition, the above driving assistance system is configured to synthesize projection images according to parameter values calculated in advance by adjusting and setting (calibrating) the positions and imaging directions (camera directions) of the respective vehicle cameras, when generating a synthesis image.

Incidentally, an vehicle camera mounted on a vehicle sometimes moves out of its proper position, imaging direction, or the like due to external forces such as vibrations during driving. In such cases, the parameter values become no longer suitable values, so that a generated synthesis image has parts of projection images synthesized out of their correct positions. Consequently, the generated image is not adequate for the driver to check the peripheral situation.

There is a generally-known method as a method for automatically evaluating whether a vehicle camera has moved out of its proper position. In this method, a plurality of vehicle cameras are disposed to image a target region (overlapping region) in an overlapping manner, and then obtained images of the overlapping region are compared.

More specifically, referring to FIG. 12, a driving assistance system including vehicle camera 10_1 and vehicle camera 10_2 is described as an example. Incidentally, a projection image of an image imaged by vehicle camera 10_1 is denoted by projection image E1, and a projection image of an image imaged by vehicle camera 10_2 is denoted by projection image E2. Further, projection images E1 and E2 are each assumed to include an image corresponding to overlapping region C.

In the driving assistance system, as shown in FIG. 12, for example, edges of white lines M1 and M2 painted on the road, or something a similar object are detected as discriminative points from an image corresponding to overlapping region C of projection image E1 and projection image E2. Further, when a plurality of projection images are overlapped and synthesized, the positions of edges of white lines M1 and M2 are compared. If a difference therebetween is large, it can be detected that a vehicle camera has moved out of its proper position.

However, in the aforementioned driving assistance system, even when a vehicle camera has not moved out of its proper position, a difference sometimes occurs in an image on an overlapping region of projection images.

For example, as shown in FIG. 13, when there is solid object P such as a pole in overlapping region C, in the driving assistance system described above, vehicle cameras disposed on different positions image solid object P from different directions. Further, when the images are converted into projection images E1 and E2, information on a height direction of solid object P is lost. Consequently, images of solid object P contained in the projection images E1 and E2 projected on a plane become images Pa and Pb, respectively, which are different from each other.

In this case, when edges of the images Pa and Pb of the solid object are set as discriminative points, a difference between images corresponding to an overlapping region in projection images E1 and E2 becomes large. In other words, when there is a solid object in overlapping region C, the above-described driving assistance system has a problem of failing to accurately detect whether a vehicle camera has moved out of its proper position, by use of the difference of the images corresponding to overlapping region C.

SUMMARY OF THE INVENTION

An aspect of the invention provides an image processor capable of accurately determining whether a vehicle camera has moved out of its proper position, the image processor generating a synthesis image by converting images imaged by a plurality of vehicle cameras into projection images projected on a plane while synthesizing the projection images.

Another aspect of the invention provides an image processor that comprises an image converter configured to convert a first image into a first projection image projected on a plane and to convert a second image into a second projection image projected on a plane, the first image acquired by imaging a first target region around a vehicle captured with a first vehicle camera, the second image acquired by imaging a second target region captured with a second vehicle camera, wherein the second target region overlaps the first target region; an image synthesizer configured to synthesize an image from the first projection image and the second projection image; a solid object determination unit configured to detect a solid object in the overlapping region from the first projection image and the second projection image; a difference calculator configured to calculate, when the solid object determination unit detects the absence of a solid object, a difference between an image corresponding to the overlapping region within the first projection image, and an image corresponding to the overlapping region within the second projection image; and a detector configured to detect movement of at least the first vehicle camera or the second vehicle camera out of position by comparing between the calculated difference and a threshold value.

In the above-described embodiment, the solid object determination unit determines whether there is a solid object in the overlapping region within the first projection image. Then, when solid object determination unit determines that there is no solid object, the difference calculator calculates the difference between an image corresponding to the overlapping region within the first projection image, and an image corresponding to the overlapping region within the second projection image.

That is, after confirming that there is no solid object in an image of the overlapping region, the difference between the image corresponding to the overlapping region within the first projection image, and the image corresponding to the overlapping region within the second projection image is calculated. Accordingly, it becomes possible to prevent the difference from being inaccurately calculated by the difference calculator due to an inclusion of a solid object within the image corresponding to the overlapping region, and to more accurately calculate the difference between the image corresponding to the overlapping region within the first projection image, and the image corresponding to the overlapping region within the second projection image.

In a driving assistance system which converts images imaged by a plurality of vehicle cameras into projection images projected on a plane, and which also generates a synthesis image by synthesizing the above-described projection images, it can be accurately determined whether vehicle cameras 10_1 to 10_4 have moved out of their proper positions.

It is preferred that the image synthesizer acquires first images from the first vehicle camera at a first and a second timing. And it is also preferred that the solid object determination unit comprises a motion vector acquisition unit configured to acquire motion vectors based on an overlapping region image within the first projection image converted from the first image acquired at the first timing and the first projection image converted from the first image acquired at the second timing; and a motion vector determination unit configured to compare the motion vectors acquired by the motion vector acquisition unit, and to detect a solid object in the overlapping region.

In the embodiment above, the solid object determination unit compares a plurality of motion vectors, and determines whether there is a solid object in the overlapping region or not. Here, when the solid object is imaged by the first vehicle camera mounted on a moving vehicle, imaging directions to the solid object at the first and second timings are different. Accordingly, in the projection image including the solid object thus imaged, corresponding images of the solid object are not the same. Consequently, the motion vectors with discriminative points such as edges of the images of the solid object are not uniform.

That is, in the above-described image processor, it is determined whether there is a solid object by determining whether a plurality of motion vectors are uniform between an image of the overlapping region of the first projection image converted from a first image imaged at the first timing, and the first projection image converted from a first image imaged at the second timing. In this manner, in the above-described driving assistance system, it is determined whether there is a solid object or not, and when there is no solid object, the difference between the image corresponding to the overlapping region within the first projection image, and the image corresponding to the overlapping region within the second projection image is calculated. Consequently, the difference can be more accurately calculated.

It is preferred that the image synthesizer acquires the first images from the first vehicle camera at a first and a second timing, and the image processor may comprises a moving distance obtaining unit configured to obtain a moving distance of a vehicle between the first timing and the second timing. It is also preferred that the solid object determination unit further comprises an identifier configured to identify a comparison region within the first projection image converted from the first image acquired at the second timing, based on the moving distance, wherein the comparison region corresponds to the overlapping region within the first projection image converted from the first image acquired at the first timing; and a determination unit configured to detect a solid object in the overlapping region, based on a difference between an image corresponding to the comparison region identified by the identifier, and an image corresponding to the overlapping region.

As described above, the solid object determination unit determines whether there is a solid object in the overlapping region based on the difference between the image corresponding to the overlapping region within the first projection image converted from a first image imaged at the first timing, and the image corresponding to the comparison region within the first projection image converted from a first image captured at the second timing.

Here, when a solid object is imaged by the first vehicle camera mounted on a moving vehicle, imaging directions to the solid object at the first and second timings are different. Accordingly, in the projection images including the solid object thus imaged, corresponding images of the solid object are not the same. Consequently, when there is a solid object, the difference between the image corresponding to the overlapping region and the image corresponding to the comparison region becomes large.

As described above, the image processor determines whether there is a solid object in the overlapping region. When there is no solid object, the difference between the image corresponding to the overlapping region within the first projection image, and the image corresponding to the overlapping region within the second projection image is calculated. Consequently, it can be more accurately detected whether a vehicle camera has moved out of its proper position or not.

Another aspect of the invention provides an image processor that comprises an image converter configured to convert a first image into a first projection image projected on a plane, the first image acquired by imaging a first target region around a vehicle captured with a first vehicle camera, and to convert a second image into a second projection image projected on a plane, the second image acquired by imaging a second target region having a region that overlaps the first target region, the second image captured with a second vehicle camera; an image synthesizer configured to generate a synthesis image from the first and second projection images; a difference calculator configured to calculate a difference between images that correspond to the overlapping regions within the first and second projection images; and a detector configured to detect movement of at least the first vehicle camera or the second vehicle camera out of position, based on the number of times that the difference calculated by the difference calculator consecutively is equal or greater to a threshold value.

In the above-described image processor, based on the number of times that the difference calculated by the difference calculator consecutively reaches or exceeds a threshold value, it is detected whether the first and second vehicle cameras have moved out of their proper positions.

Here, in the case where any one of the first and second vehicle camera has moved out of its proper position, the difference between the image corresponding to the overlapping region within the first projection image, and the image corresponding to the overlapping region within the second projection image takes a value not less than the threshold value regardless of how many times images are captured. Further, in the case where although the first or second vehicle camera has not moved out of its proper position, the difference between the image corresponding to the overlapping region within the first projection image, and the image corresponding to the overlapping region within the second projection image becomes large. However, when the solid object disappears in overlapping region due to the moving of the vehicle, the difference becomes less than the threshold value.

In this manner, in the above-described image processor, based on the number of times that the calculated difference consecutively reaches or exceeds the threshold value, it is determined and detected whether there is a solid object in the overlapping region, or whether a vehicle camera has moved out of its proper position. Consequently, it can be more accurately detected whether the vehicle camera has moved out of its proper position or not.

Another aspect of the invention provides a driving assistance system that comprises a first vehicle camera configured to image a first target region around a vehicle; a first acquisition unit configured to acquire a first image imaged by the first vehicle camera; a second vehicle camera configured to image a second target region around the vehicle; and a second acquisition unit configured to acquire a second image imaged by the second vehicle camera; an image converter configured to convert a first image into a first projection image projected on a plane and to convert a second image into a second projection image projected on a plane, the first image acquired by imaging a first target region around a vehicle captured with a first vehicle camera, the second image acquired by imaging a second target region captured with a second vehicle camera, wherein the second target region overlaps the first target region; an image synthesizer configured to synthesize an image from the first projection image and the second projection image; a solid object determination unit configured to detect a solid object in the overlapping region from the first projection image and the second projection image; a difference calculator configured to calculate, when the solid object determination unit determines the absence of a solid object, a difference between an image corresponding to the overlapping region within the first projection image, and an image corresponding to the overlapping region within the second projection image; and a detector configured to detect movement at least the first vehicle camera or the second vehicle camera out of position by comparing between the calculated difference and a threshold value.

Another aspect of the invention provides a out-of-position detecting method that comprises converting a first image into a first projection image projected on a plane, the first image acquired by imaging a first target region around a vehicle from a first vehicle camera; converting a second image into a second projection image projected on a plane, the second image acquired by imaging a second target region having a region that overlaps the first target region, from a second vehicle camera; generating a synthesis image from the first and second projection images; detecting a solid object in the overlapping region; calculating, when no solid object is detected, a difference between an image corresponding to the overlapping region within the first projection image, and an image corresponding to the overlapping region within the second projection image; and detecting movement of at least the first vehicle camera or the second vehicle camera out of position by comparing the calculated difference and a threshold value.

Another aspect of the invention provides a out-of-position detecting method that comprises obtaining a first image of a first target region around a vehicle with a first vehicle camera, and converting the first image into a first projection image projected onto a plane; obtaining a second image of a second overlapping target region around the vehicle with a second vehicle camera, and converting the second image into a second projection image projected on a plane, synthesizing the first projection image and the second projection image into a synthesis image; comparing the overlapping regions of the first and second projection images to generate comparison results; and detecting movement of at least the first vehicle camera or the second vehicle camera out of position based on the number of times that the calculated difference is consecutively equal or greater to a threshold value.

BRIEF DESCRIPTION OF THE DRAWINGS

FIG. 5 is a flowchart showing operation of the driving assistance system of the first embodiment;

DETAILED DESCRIPTION OF THE EMBODIMENTS

Figure 1:
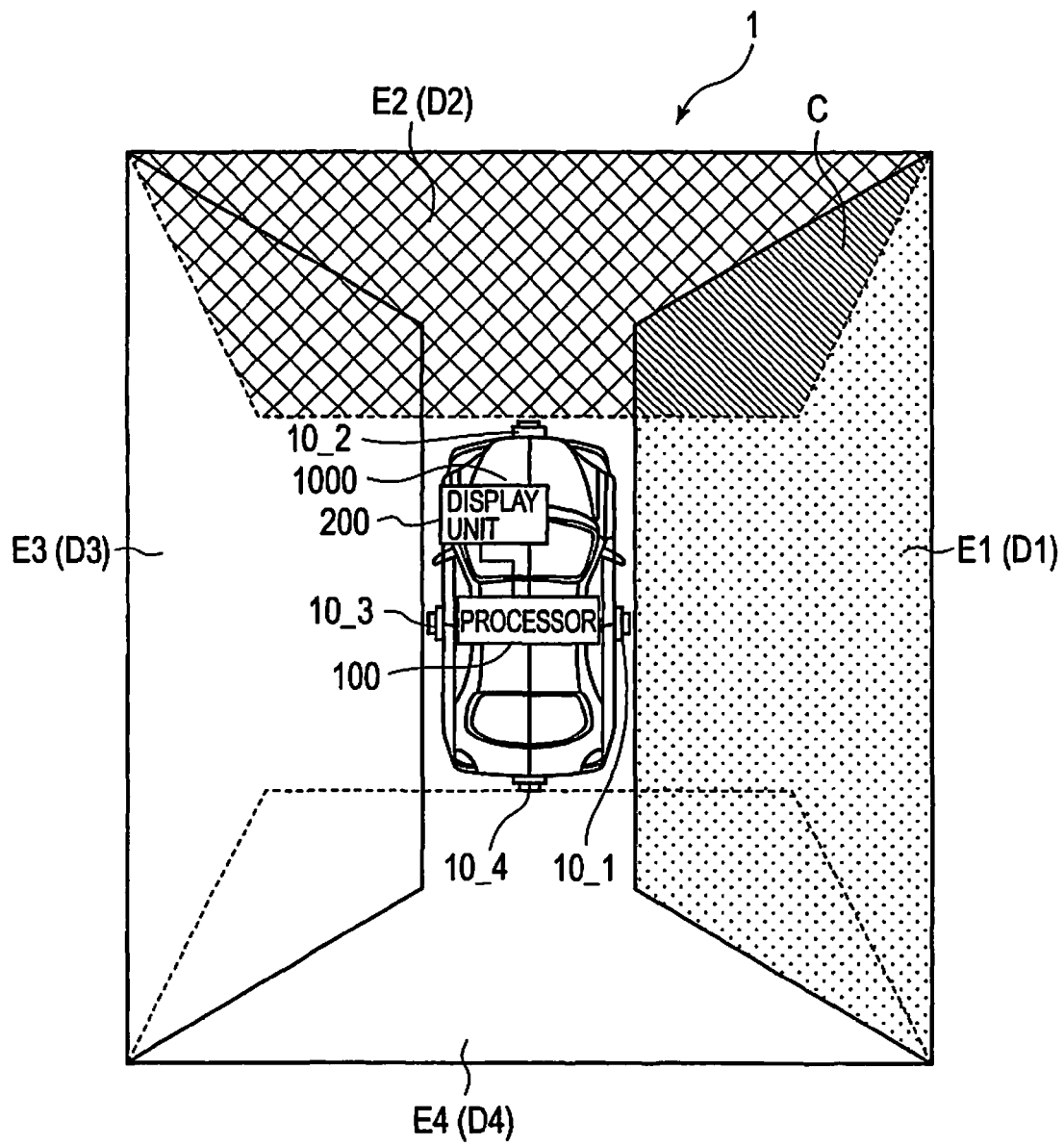
FIG. 1 shows a schematic configuration of a driving assistance system of a first embodiment of the invention.

Embodiments of driving assistance system 1 of a first embodiment will be described with reference to FIG. 1. FIG. 1 is an entire diagrammatic view of driving assistance system 1 of the first embodiment.

As shown in FIG. 1, driving assistance system 1 of this embodiment is provided to vehicle 1000. Further, driving assistance system 1 includes vehicle cameras 10_1 to 10_4, and processor 100 (image processor). Note that, although display unit 200 is shown in FIG. 1, it is not necessary to include display unit 200 in driving assistance system 1.

Respective imaging directions of vehicle cameras 10_1 to 10_4 are different. In this embodiment, vehicle camera 10_1 images in a right direction of the vehicle, and captures a first image; vehicle camera 10_2 images in a front direction of the vehicle, and captures a second image; vehicle camera 10_3 images in a left direction of the vehicle, and captures a third image; and vehicle camera 10_4 images in a rear direction of the vehicle, and captures a fourth image. Further, vehicle cameras 10_1 to 10_4 image target regions D1 to D4 around vehicle 1000, and capture images.

Further, target regions D1 to D4 imaged by vehicle cameras 10_1 to 10_4 have overlapping regions overlapping each other. More specifically, target region D1 has an overlapping region overlapping target region D2, and another overlapping region overlapping target region D4. Target region D2 has an overlapping region overlapping target region D1, and another overlapping region overlapping target region D3. Target region D3 has an overlapping region overlapping target region D2, and another overlapping region overlapping target region D4. Target region D4 has an overlapping region overlapping target region D1, and another overlapping region overlapping target region D3. Incidentally, for the sake of description of this embodiment, a region on which target region D1 and target region D2 overlap each other is set as overlapping region C. Further, vehicle cameras 10_1 to 10_4 image target regions D1 to D4 periodically at common timing.

Further, in this embodiment, vehicle camera 10_1 configures a first vehicle camera which images target region D1 (first target region) around the vehicle, and which captures a first image. Still further, vehicle camera 10_2 configures a second vehicle camera which images target region D2 (second target region) around the vehicle, and which captures a second image.

Processor 100 is connected to vehicle cameras 10_1 to 10_4. Further, processor 100 receives input of respective images captured by vehicle cameras 10_1 to 10_4, and converts the respective images into projection images projected on the ground (a plane) for the vehicle. In addition, processor 100 generates a synthesis image by synthesizing the respective projection images obtained through the conversion, and displays the synthesis image on display unit 200.

In this embodiment, for the sake of description of this embodiment, a projection image representing the first image projected on a ground coordinate system is denoted by projection image E1; a projection image representing the second image projected on the ground coordinate system is denoted by projection image E2; a projection image representing the third image projected on the ground coordinate system is denoted by projection image E3; and a projection image representing the fourth image projected on the ground coordinate system is denoted by projection image E4.

Display unit 200 is connected to processor 100. Further, display unit 200 receives input of a synthesis image outputted from processor 100, and displays the same. In addition, for display unit 200, a display panel or the like included in a vehicle navigation system or the like can be used.

(Configuration of Processor)

Next, a configuration of processor 100 will be specifically described with reference to the accompanying drawings. In the following description, parts related to the present invention will be mainly described. Accordingly, for processor 100, when a function as a processor is implemented, processor 100 includes in some cases functional blocks (such as power source unit) which are not shown, or description of which is omitted.

Figure 2:
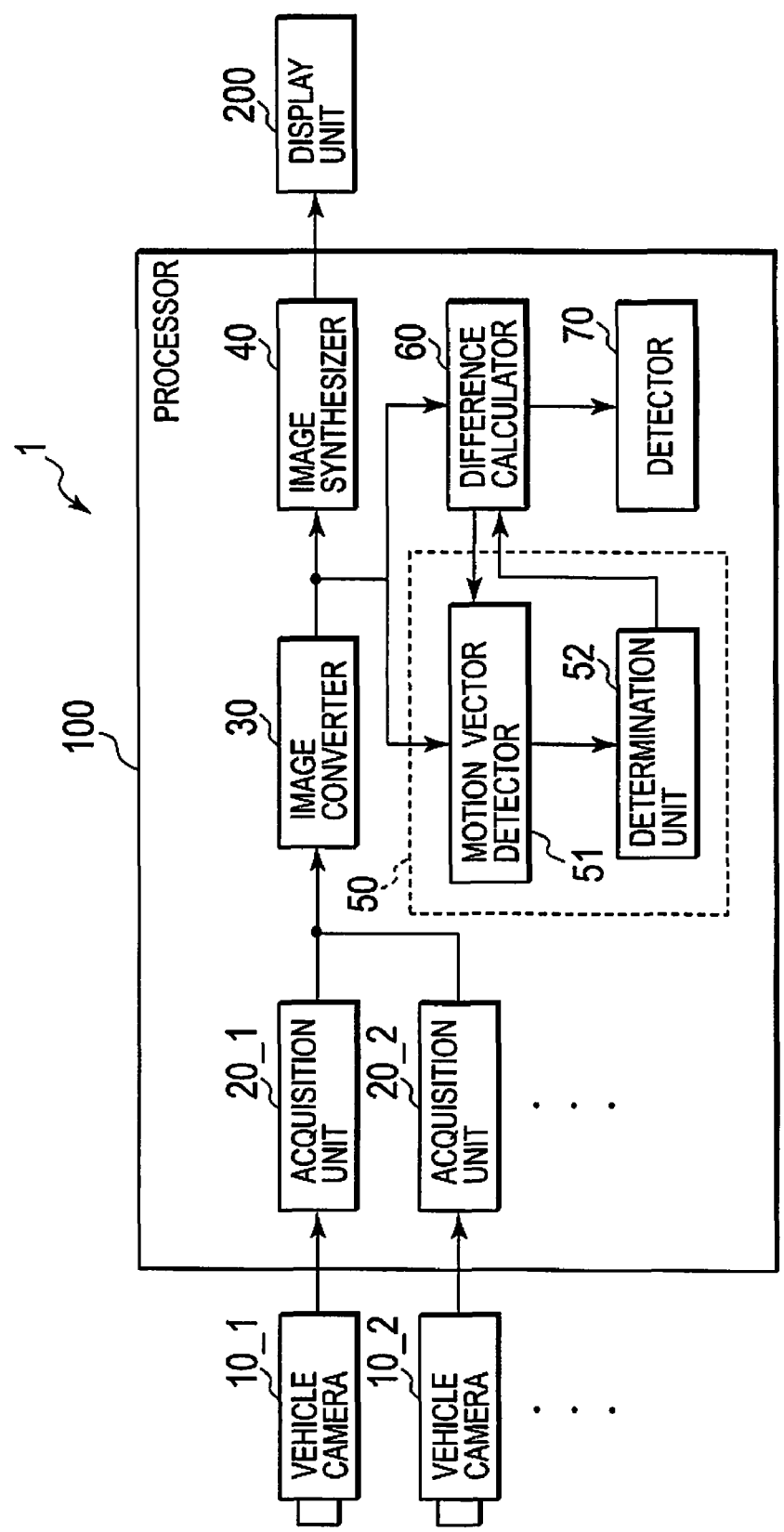
FIG. 2 is a block diagram of the driving assistance system of the first embodiment of the invention.

FIG. 2 is a block diagram showing processor 100. As shown in FIG. 2, processor 100 includes acquisition units 20_1 and 20_2, image converter 30, image synthesizer 40, solid object determination unit 50, difference calculator 60, and detector 70.

Acquisition units 20_1 and 20_2 are respectively connected to vehicle camera 10_1 and vehicle camera 10_2. Acquisition unit 20_1 acquires and stores the first image captured by vehicle camera 10_1. Acquisition unit 20_2 acquires and stores the second image captured by vehicle camera 10_2. Incidentally, processor 100 may include acquisition unit 20_3 to be connected to vehicle camera 10_3, and acquisition unit 20_4 to be connected to vehicle camera 10_4. In this embodiment, a description thereof is omitted. In this embodiment, acquisition unit 20_1 configures a first acquisition unit, and acquisition unit 20_2 configures a second acquisition unit.

Image converter 30 is connected to acquisition units 20_1 and 20_2, and acquires the first and second images stored in acquisition units 20_1 and 20_2. Image converter 30 converts the first image into projection image E1 (first projection image) projected on the ground (a plane), and converts the second image into projection image E2 (second projection image) projected on the ground (a plane).

Figure 3:
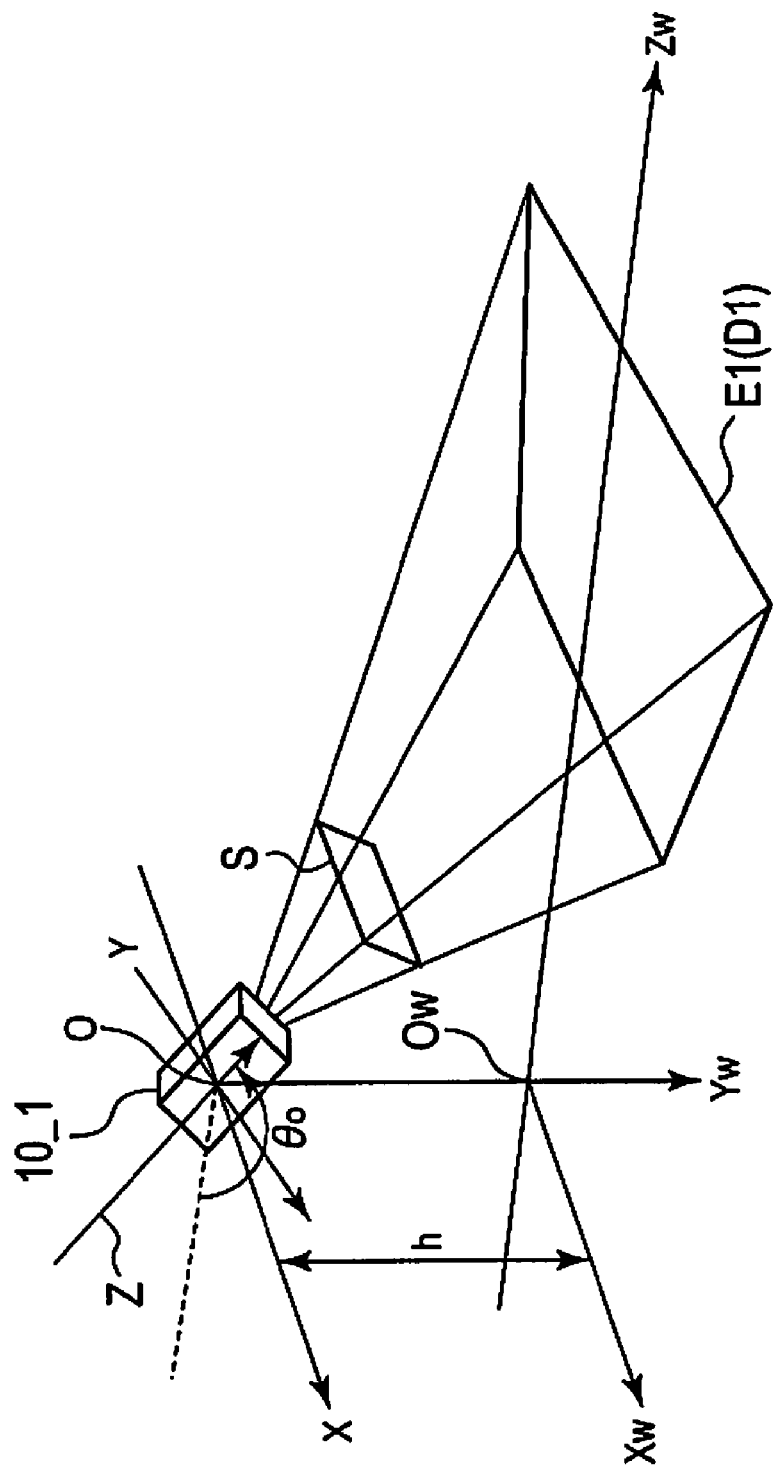
FIG. 3 shows an image at the time when converting an image of a vehicle camera of the first embodiment into a projection image projected on the ground (a plane)

FIG. 3 is a view showing an image representing a projection image converted by image converter 30. Here, the first image captured by vehicle camera 10_1 is considered as an example for description. FIG. 3 shows a relationship between a coordinate system XYZ of vehicle camera 10_1, first image surface S of the first image captured by vehicle camera 10_1, and a world coordinate system Xw Yw Zw including a ground (plane) coordinate system Xw Zw. In the camera coordinate system XYZ, with an optic center of vehicle camera 10_1 set as an origin O, a Z-axis is taken in a direction of an optical axis; an X-axis is taken in a direction perpendicular to the Z-axis and parallel to the ground; and an Y-axis is taken in a direction perpendicular to the X- and Z-axes.

In the world coordinate axis Xw Yw Zw, with an intersection at which a vertical line passing through the origin O of the camera coordinate system XYZ intersects the ground set as an origin Ow, a Yw-axis is taken in a direction perpendicular to the ground; an Xw-axis is taken in a direction parallel to the X-axis of the camera coordinate system XYZ; and a Zw-axis is taken in a direction perpendicular to the Xw- and Yw-axes. An amount of parallel translation between the world coordinate system Xw Yw Zw and the camera coordinate system XYZ is represented by [0, h, 0], and an amount of rotation with respect to the X-axis is represented by $\theta_o$.

Image converter 30 calculates, based on a focal distance and the like of a camera set in advance, a first image surface S on the camera coordinate system XYZ, of the first image captured by vehicle camera 10_1. In addition, image converter 30 converts first image surface S into the projection image E1 projected on the coordinate plane Xw-Zw of the world coordinate system. Further, image converter 30 also converts the second to fourth images into projection images E2 to E4, respectively.

Further, based on respective positions and imaging directions (camera directions) of vehicle camera 10_1 to vehicle camera 10_4 on the vehicle, image converter 30 converts projection images E1 to E4 into coordinates of a vehicle coordinate system. With a vehicle center set as an origin, the vehicle coordinate system serves as a common coordinate system. Thus, projection image E1 is converted as an image on a right side of the vehicle; projection image E2 is converted as an image on a front side of the vehicle; projection image E3 is converted as an image on a left side of the vehicle; and projection image E4 is converted as an image on a rear side of the vehicle. Further, image converter 30 outputs projection images E1 to E4 thus converted to image synthesizer 40, solid object determination unit 50, and difference calculator 60.

Image synthesizer 40 receives input of projection images E1 to E4 from image converter 30, and synthesizes the same to generate a synthesis image. In this embodiment, image synthesizer 40 configures an image synthesizer which generates a synthesis image by synthesizing projection images E1 and E2 converted by image converter 30.

Solid object determination unit 50 determines whether there is a solid object on overlapping regions on which target regions D1 to D4 overlap each other. To be more precise, solid object determination unit 50 includes motion vector acquisition unit 51, and determination unit 52.

Of timings at which vehicle cameras 10_1 to 10_4 periodically capture images, motion vector acquisition unit 51 acquires a plurality of motion vectors based on an image corresponding to overlapping region C within projection image E1 into which a first image captured at timing t1 (first timing) is converted, and projection image E1 into which a first image captured at timing t2 (second timing) subsequent to timing t1 is converted. Here, of timings at which vehicle cameras 10_1 to 10_4 periodically capture images, timings t1 and t2 may be continuous timings, or may be timings spaced a predetermined timing apart (for example, timings at which a first image is captured are spaced two times apart).

More specifically, motion vector acquisition unit 51 receives input of respective projection images E1 captured during a period of timing t1 to timing t2 from image converter 30, and detects a plurality of discriminative points which are common to an image corresponding to overlapping region C within projection image E1 of timing t1 and an image within projection image E1 of timing t2. Here, as the discriminative points, pixels of an edge portion, a change in pixel values of which is large compared with that of peripheral pixels, may be used. Further, motion vector acquisition unit 51 acquires a plurality of motion vectors based on the plurality of discriminative points thus detected. Still further, motion vector acquisition unit 51 informs determination unit 52 of the plurality of motion vectors thus acquired.

Determination unit 52 compares the plurality of motion vectors acquired by motion vector acquisition unit 51, and determines whether there is a solid object in overlapping region C. To be more specific, informed of the plurality of motion vectors from motion vector acquisition unit 51, determination unit 52 determines whether respective motion vectors are uniform. At this time, based on a vector direction tolerance value and a vector amount (length) tolerance value stored in advance, determination unit 52 determines whether a difference between the plurality of motion vectors is within the tolerance values. When the difference between the plurality of motion vectors is within the tolerance values, determination unit 52 determines that the motion vectors are uniform; and when the difference therebetween exceeds the tolerance values, determination unit 52 determines that the motion vectors are not uniform. Further, when the motion vectors are determined to be uniform, determination unit 52 determines that there is no solid object in overlapping region C, while when motion vectors are determined not to be uniform, determination unit 52 determines that there is a solid object in overlapping region C. Determination unit 52 informs difference calculator 60 of determined results.

When solid object determination unit 50 determines that there is no solid object, difference calculator 60 compares images corresponding to overlapping regions of projection images, and calculates a difference (an amount of out-of-position) between vehicle cameras.

Here, projection images E1 and E2 are considered for the sake of description of the above. When solid object determination unit 50 determines that there is no solid object in the overlapping region C, difference calculator 60 calculates a difference between an image corresponding to an overlapping region within projection image E1, and an image corresponding to an overlapping region within projection image E2.

Figure 4A:
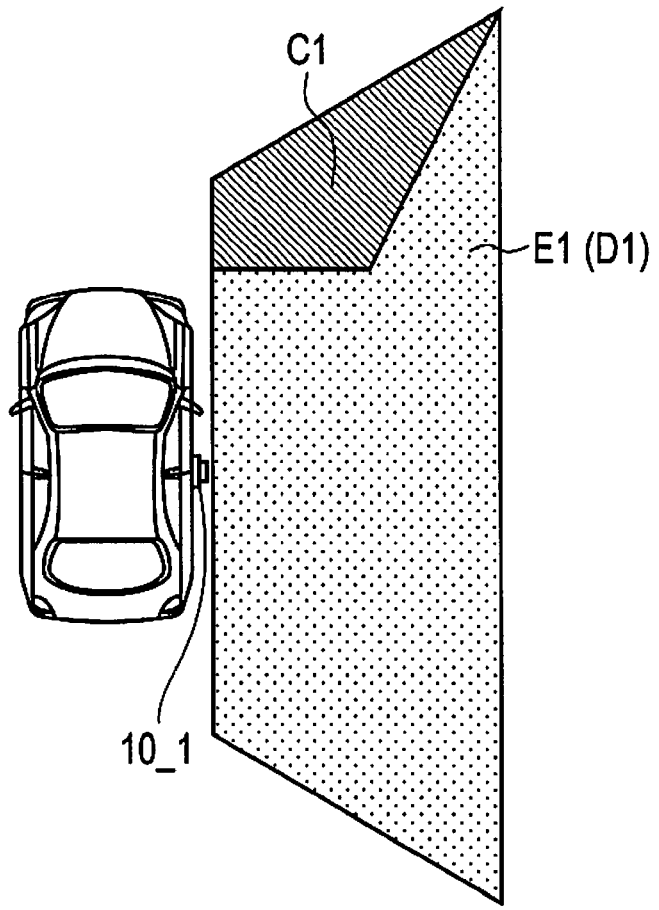
FIG. 4A shows an image of projection image E1 of the first embodiment.
Figure 4B:
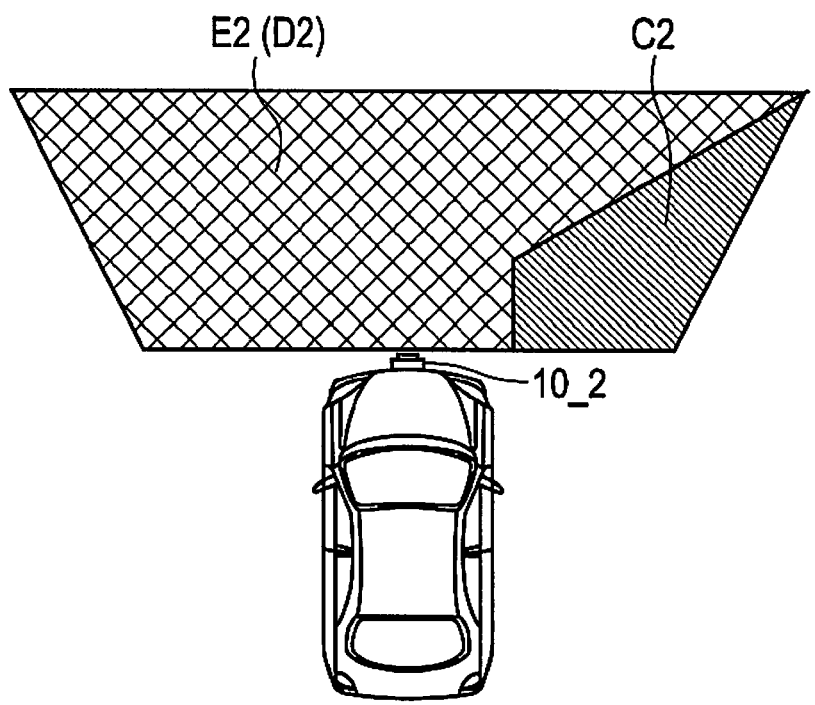
FIG. 4B is a view showing an image of projection image E2 of the first embodiment.

FIG. 4A is a view showing an image of projection image E1 into which a first image imaged by vehicle camera 10_1 is projected on a plane and converted, and FIG. 4B is a view showing an image of projection image E2 into which a second image imaged by vehicle camera 10_2 is projected on a plane and converted.

AS shown in FIGS. 4A and 4B, when solid object determination unit 50 determines that there is no solid object, difference calculator 60 calculates a difference between an image corresponding to overlapping region C1 within projection image E1, and an image corresponding to overlapping region C2 within projection image E2, based on projection images E1 and E2 inputted from image converter 30. Here, for the image within overlapping region C1 and the image within overlapping region C2, difference calculator 60 detects, in the images, discriminative points which are common to the respective images. Difference calculator 60 then calculates, as a difference, a difference of the positions of the discriminative points obtained by overlapping the image of overlapping region C1 of projection image E1 with the image of overlapping region C2 of projection image E2. In addition, difference calculator 60 determines whether the calculated difference is not less than a threshold value stored in advance, and informs detector 70 of a determined result.

When the difference calculated by difference calculator 60 is not less than the threshold value, detector 70 detects it as occurrence of out-of-position in vehicle camera 10_1 or vehicle camera 10_2. When the occurrence of out-of-position is detected, detector 70 may inform the driver (a user) of the occurrence thereof. As ways of informing, a buzzer sound may be used, or characters such as "abnormality" or the like may be displayed on display unit 200. Further, the case has been shown where detection is performed on whether an out-of-position has occurred in vehicle camera 10_1 or vehicle camera 10_2 based on the difference occurring between overlapping region C1 of projection image E1 and overlapping region C2 of projection image E2; however, detection may be performed on whether an out-of-position has occurred in vehicle camera 10_3 or vehicle camera 10_4 based on a difference between overlapping regions of projection image E3 and projection image E4.

(Operation of Processor)

Next, operation of driving assistance system 1 having the above-described configuration will be described. Specifically, referring to FIG. 5, control operation at the time when processor 100 performs a detection of out-of-position is described. Meanwhile, below, the control operation will be described with reference to an example of operation in which detection of out-of-position is performed on vehicle cameras 10_1 and 10_2.

In Step S110, acquisition units 20_1 and 20_2 acquire and store first and second images captured at specific timing t1, from vehicle cameras 10_1 and 10_2 capturing images periodically.

In Step S120, image converter 30 acquires the first and second images from acquisition units 20_1 and 20_2, and converts the first image into projection image E1 projected on the ground (a plane), and concurrently converts the second image into projection image E2 projected on the ground (a plane). Further, image converter 30 converts projection images E1 and E2 into those in the vehicle coordinate system being a common system thereof, and outputs projection images E1 and E2 thus converted to motion vector acquisition unit 51 and difference calculator 60.

In Step S130, difference calculator 60 receives input of projection images E1 and E2 from image converter 30. To detect discriminative points, motion vector acquisition unit 51 performs a search within an image corresponding to overlapping region C of projection image E1, and within an image corresponding to overlapping region C of projection image E2. When a discriminative point is detecting, difference calculator 60 informs motion vector acquisition unit 51 of the detection. When no discriminative point is detected by difference calculator 60, operations from Step S110 to S130 are repeated in processor 100.

In Step S140, in an operation in which vehicle camera 10_1 periodically shoots images and captures a first image, vehicle camera 10_1 captures a first image at timing t2 subsequent to timing t1. Acquisition units 20_1 and 20_2 acquire the first image captured at timing t2, from vehicle camera 10_1.

In Step S150, after acquisition unit 20_1 acquires the first image at timing t2, image converter 30 converts the first image into projection image E1 projected on a plane. Further, image converter 30 converts the first image into one in the vehicle coordinate system, and outputs converted projection image E1 to motion vector acquisition unit 51.

In Step S160, after receiving information, from difference calculator 60, indicating that a discriminative point has been detected, motion vector acquisition unit 51 retains projection image E1 converted from an image captured at timing t1, and concurrently acquires projection image E2 converted from an image captured at timing t2 from image converter 30. Further, motion vector acquisition unit 51 acquires a plurality of motion vectors between an image corresponding to overlapping region C within projection image E1 of timing t1, and projection image E1 of timing t2. In addition, motion vector acquisition unit 51 informs determination unit 52 of the plurality of motion vector thus acquired.

In Step S170, determination unit 52 determines whether the plurality of motion vectors informed from motion vector acquisition unit 51 are uniform. At this time, based on a vector direction tolerance value and a vector amount (length) tolerance value stored in advance, determination unit 52 determines whether the plurality of motion vectors are within the tolerance values. When the plurality of motion vectors are within the tolerance values, determination unit 52 determines that the plurality of motion vectors are uniform; and when the plurality of motion vectors exceed the tolerance values, determination unit 52 determines that the plurality of motion vectors are not uniform. Further, when the plurality of motion vectors are determined to be uniform, determination unit 52 informs difference calculator 60 of a result thus determined.

Figure 6:
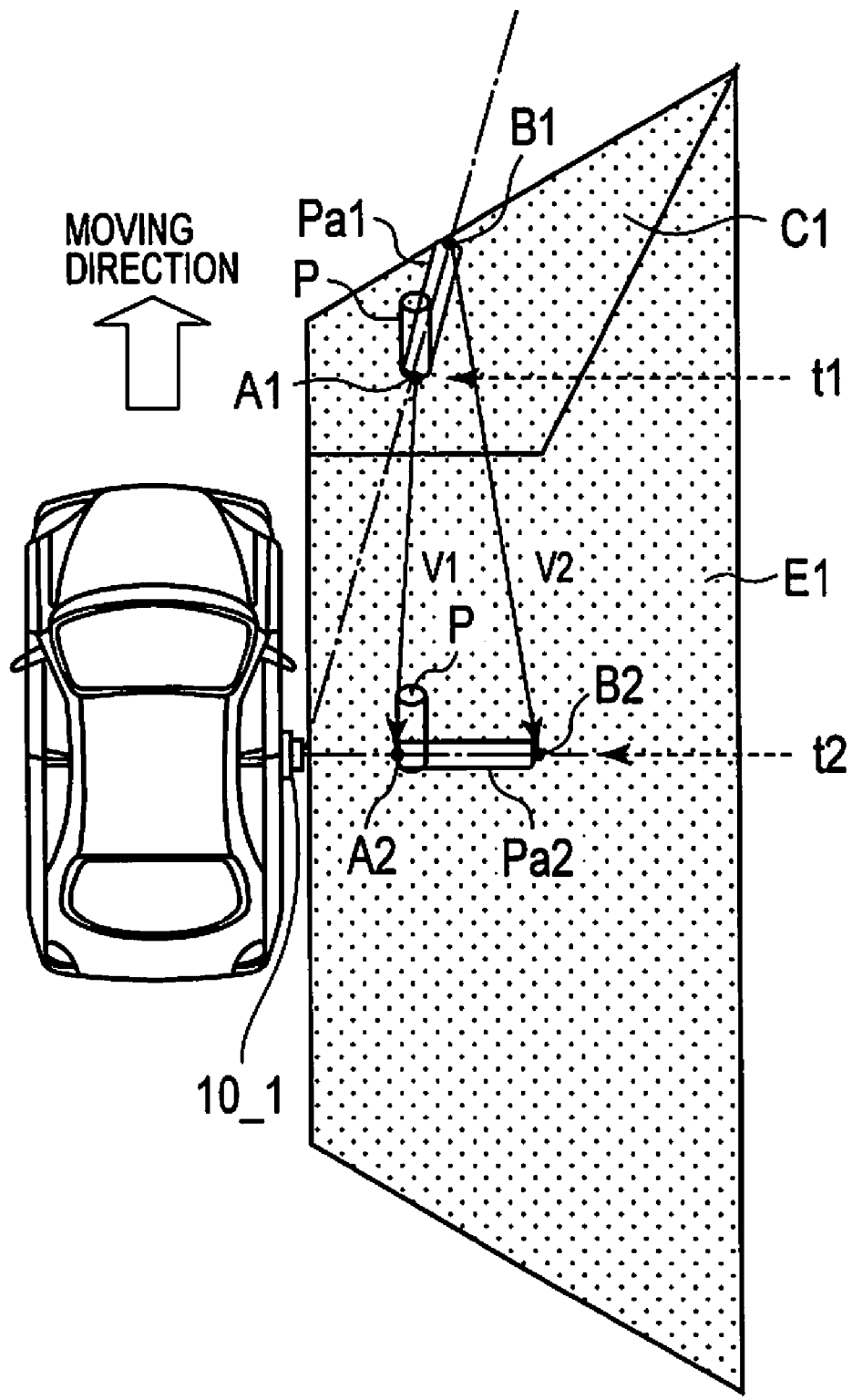
FIG. 6 shows an image obtained by overlapping projection images E1 captured at timing t1 and projection images E1 captured at timing t2 in the driving assistance system of the first embodiment.

Here, FIG. 6 is a view showing an image obtained by overlapping projection images E1 captured at timings t1 and t2 by processor 100 in the aforementioned Steps S160 and S170. For example, it is assumed that image Pa1 of solid object P such as a pole is included in an image corresponding to overlapping region C1 within projection image E1 converted from an image captured by vehicle camera 10_1 at timing t1, and image Pa2 of solid object P, which has been translated along with the move of vehicle 1000, is included within projection image E1 converted from an image captured at timing t2.

Motion vector acquisition unit 51 detects discriminative points A1 and B1 from image Pa1 in an image corresponding to overlapping region C1 within projection image E1 captured at timing t1, and also detects discriminative points A2 and B2 from image Pa2 within projection image E1 captured at timing t2. Thereafter, motion vector acquisition unit 51 acquires motion vectors V1 and V2 based on discriminative points A1 and A2, and discriminative points B1 and B2. When there is solid object P in overlapping region C1, motion vectors V1 and V2 become not uniform between projection image E1 captured at timing t1, and projection image E1 captured at timing t2. Accordingly, determination unit 52 can determine that there is solid object P in overlapping region C1. On the other hand, when the motion vectors are uniform, determination unit 52 can determine that the solid object does not exist.

In Step S180, after receiving information from determination unit 52 indicating that the plurality of motion vectors are uniform, difference calculator 60 calculates a difference between projection image E1 converted from the first image captured at timing t1 and projection image E2 converted from the second image captured at timing t1. To be more precise, difference calculator 60 detects a discriminative point such as an edge within an image corresponding to overlapping region C within projection image E1, and concurrently detects a common discriminative point such as an edge within an image corresponding to overlapping region C within projection image E2. Further, difference calculator 60 calculates a difference (an amount of out-of-position) between the position of the discriminative point detected within projection image E1, and the position of the discriminative point detected within projection image E2. Then, calculator 60 determines whether the calculated difference is not less than a threshold stored in advance. Further, difference calculator 60 informs detector 70 of a result thus determined.

In Step S190, when the difference is determined to be not less than the threshold by difference calculator 60, detector 70 detects that vehicle camera 10_1 or vehicle camera 10_2 has moved out of its proper position or out of its proper imaging direction. At this time, detector 70 may inform about the above using a buzzer sound or the like.

In Steps S110 to S190 described above, the description has been given using the example of the operation in which it is detected whether vehicle cameras 10_1 and 10_2 have moved out of their proper positions, based on projection images E1 and E2. However, detection may also be performed on whether vehicle cameras 10_2 and 10_3 have moved out of their proper positions, based on projection images E2 and E3, or detection may also be performed on whether vehicle cameras 10_3 and 10_4 have moved out of their proper positions, based on projection images E3 and E4. In short, various combinations are possible.

(Operation/Effect of Driving Assistance System of First Embodiment)

In driving assistance system 1 of the first embodiment, in processor 100, solid object determination unit 50 determines whether there is a solid object in an overlapping region within projection image E1, and when solid object determination unit 50 determines that there is no solid object, difference calculator 60 calculates a difference between an image corresponding to overlapping region C1 within projection image E1, and an image corresponding to overlapping region C2 within projection image E2.

That is, in processor 100, after confirming that there is no solid object in an image of overlapping region C, a difference between an image corresponding to overlapping region C1 within projection image E1, and an image corresponding to overlapping region C2 within projection image E2 is calculated. Therefore, driving assistance system 1 is capable of preventing the difference from being inaccurately calculated by difference calculator 60 due to an inclusion of a solid object within an image corresponding to an overlapping region. Driving assistance system 1 is therefore capable of more accurately calculating a difference between an image corresponding to overlapping region C1 within projection image E1, and an image corresponding to overlapping region C2 within projection image E2.

As described above, in driving assistance system 1 which converts images captured by a plurality of vehicle cameras 10_1 to 10_4 into projection images projected on a plane, and which concurrently generates a synthesis image by synthesizing the above-described projection images, processor 100 is capable of accurately determining whether vehicle cameras 10_1 to 10_4 have moved out of their proper positions.

Further, in processor 100 of driving assistance system 1 of this embodiment, solid object determination unit 50 compares a plurality of motion vectors, and determines whether there is a solid object in an overlapping region. For example, when a solid object is imaged by vehicle camera 10_1 mounted on a moving vehicle, imaging directions to the solid object at timings t1 and t2 are different. In projection images E1 including the solid object thus imaged, corresponding images of the solid object are not the same. Accordingly, motion vectors V1 and V2 with discriminative points such as edges of the images of the solid object are not uniform.

That is, in the above-described processor 100, it is determined whether there is a solid object by determining whether a plurality of motion vectors are uniform between an image of overlapping region C of projection image E1 converted from a first image imaged at timing t1, and projection image E1 converted from a first image imaged at timing t2. When there is no solid object, a difference between an image corresponding to overlapping region C1 within projection image E1, and an image corresponding to overlapping region C2 within projection image E2 is calculated, so that the difference can be accurately calculated.

(Second Embodiment)
(Configuration of Driving Assistance System of Second Embodiment of Present Invention)

Figure 7:
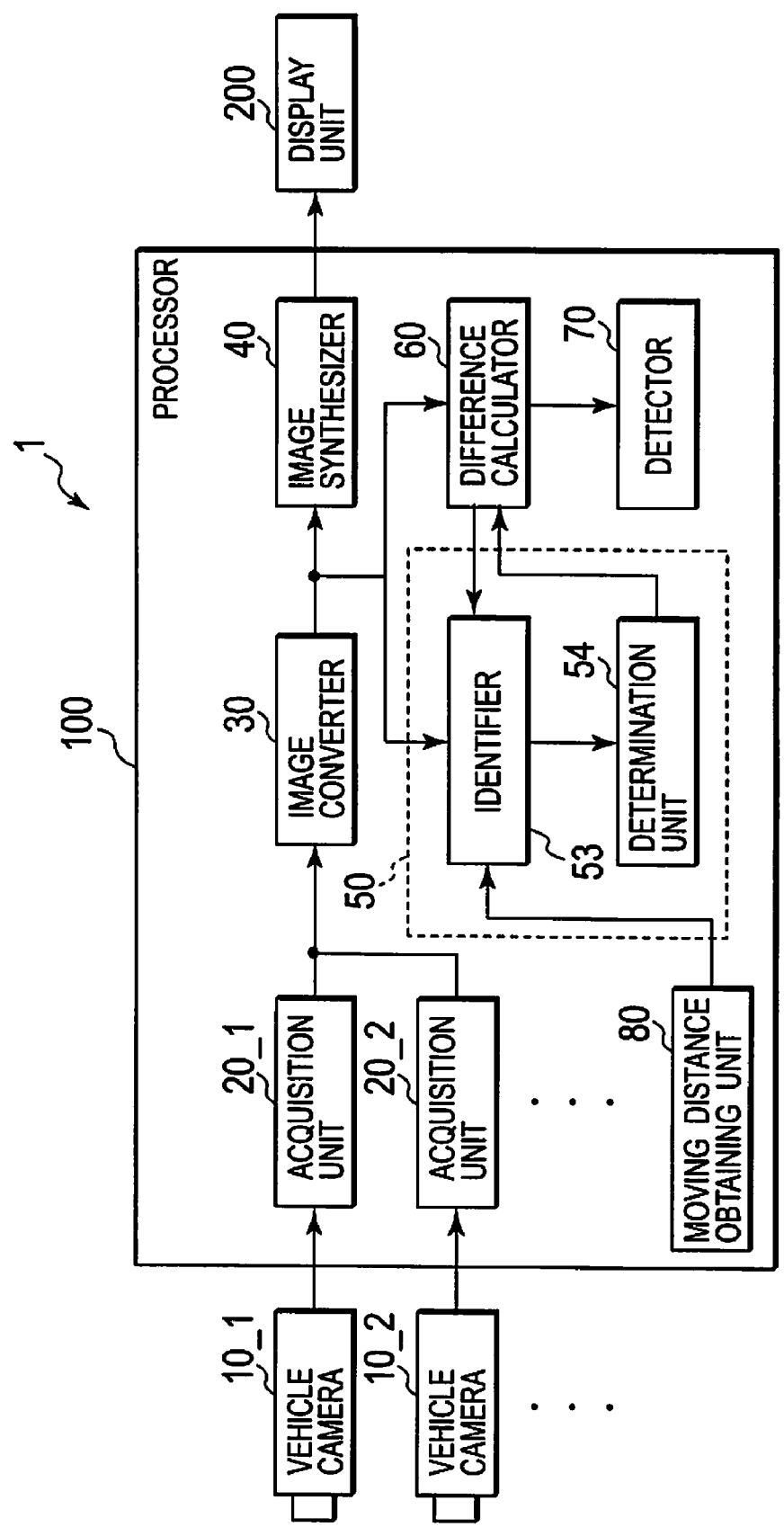
FIG. 7 is a block diagram showing a driving assistance system of a second embodiment.

A second embodiment of the present invention will be described with particular attention focused on points different from the first embodiment. FIG. 7 is a block diagram showing processor 100 (an image processor) of this embodiment. As shown in FIG. 7, processor 100 further includes moving distance obtaining unit 80. Further, solid object determination unit 50 includes determination unit 53 and identifier 54.

While vehicle cameras 10_1 to 10_4 capture images periodically, moving distance obtaining unit 80 obtains a moving distance L of a vehicle between timing t1 (a first timing) and timing t2 (a second timing) coming after timing t1.

For example, moving distance obtaining unit 80 detects the number of rotations of a wheel in a period of timing t1 to timing t2. A moving distance L of a wheel is acquired based on the detected amount of rotations and an outer circumference stored in advance. Of timings at which vehicle cameras 10_1 to 10_4 periodically capture images, timings t1 and t2 may be continuous timings, or may be timings spaced a predetermined timing apart (for example, timings at which a first image is captured are spaced two times apart). Incidentally, moving distance obtaining unit 80 may be configured so that moving distance obtaining unit 80 detects a direction of movement of a vehicle, and acquires a moving distance L including a moved distance, and a direction of movement.

Based on the moving distance L, identifier 53 identifies a comparison region within projection image E1 (a first projection image) converted from a first image captured at timing t2, the comparison region corresponding to an overlapping region C within projection image E1 (a first projection image) converted from a first image captured at timing t1.

Determination unit 54 determines whether there is a solid object in overlapping region C based on a difference between an image corresponding to the comparison region within projection image E1 captured at timing t2, the comparison region being identified by identifier 53, and an image corresponding to overlapping region C within projection image E1 captured at timing t1.

For example, determination unit 54 detects a plurality of discriminative points common to the image corresponding to overlapping region C and the image corresponding to the comparison region. Determination unit 54 overlaps the image corresponding to overlapping region C and the image corresponding to the comparison region, for example, with respect to edges of the regions, and determines whether differences between the positions of the plurality of discriminative points at the time when overlapping are not less than a threshold stored in advance. Further, difference calculator 60 informs detector 70 of a result thus determined.

(Operation of Driving Assistance System of Second Embodiment)

Figure 8:
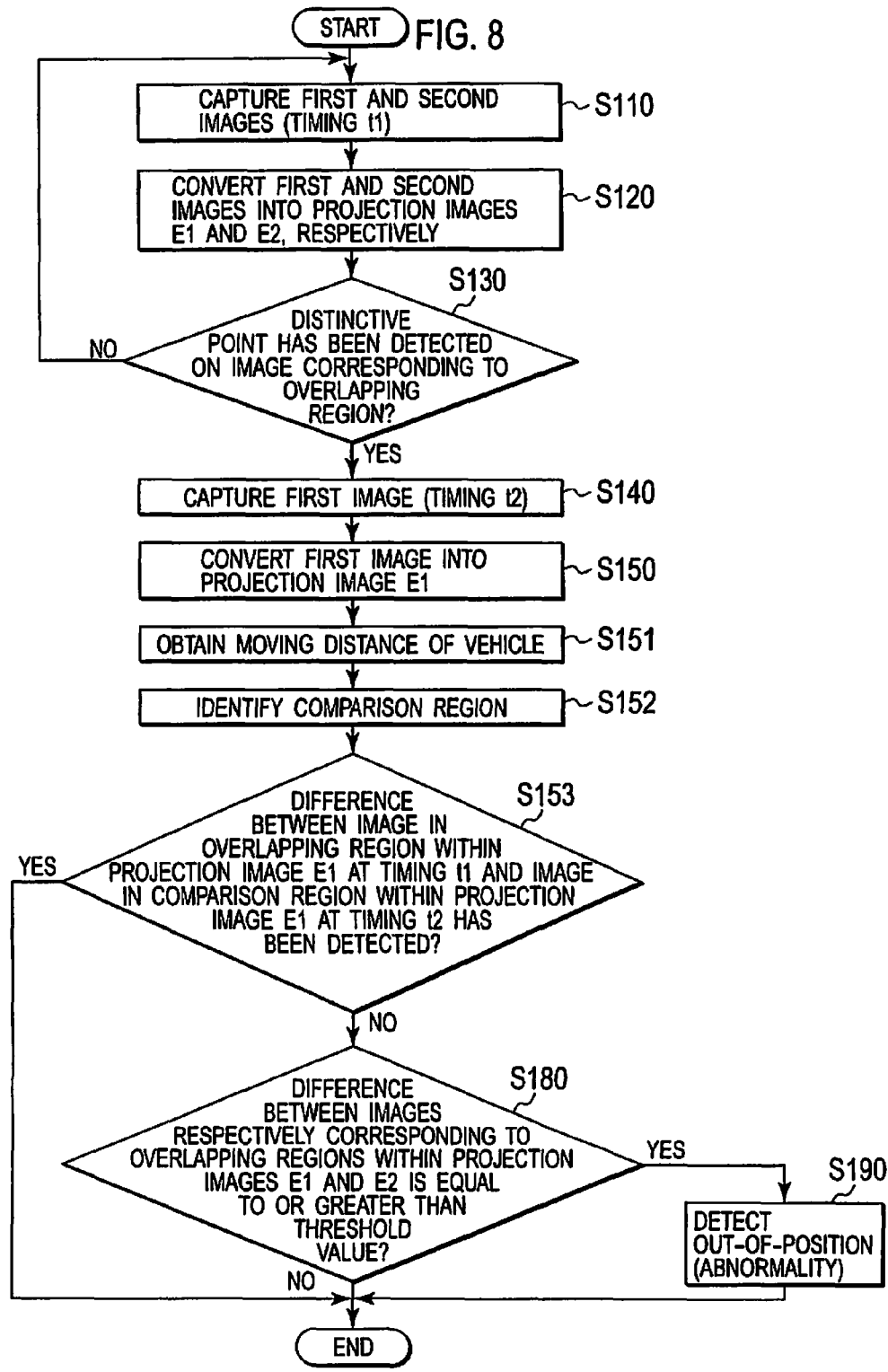
FIG. 8 is a flowchart showing operation of the driving assistance system of the second embodiment.

Operation of driving assistance system 1 having the above-described configuration will be described. Specifically, referring to FIG. 8, control operation at the time when processor 100 performs a detection of out-of-position will be described. Here, the control operation will be described with reference to an example of operation in which it is detected whether vehicle camera 10_1 and vehicle camera 10_2 have moved out of their proper positions.

Here, since operations of Steps S110 to S150 are the same as those of Steps S110 to S150 of the first embodiment, further descriptions thereof are omitted.

In Step S151, moving distance obtaining unit 80 acquires a moving distance L by which a vehicle has moved, between timing t1 and timing t2.

In Step S152, based on the moving distance L acquired by moving distance obtaining unit 80, identifier 53 identifies a comparison region corresponding to overlapping region C of projection image E1 of timing t1, within projection image E1 of timing t2.

In Step S153, determination unit 54 calculates a difference between an image corresponding to overlapping region C within projection image E1 captured at timing t1, and an image of the comparison region within projection image E1 captured at timing t2, the comparison region being identified by identifier 53. Further, determination unit 54 determines whether the calculated difference is not less than a threshold value stored in advance. In addition, determination unit 54 informs detector 70 of a result thus determined.

Figure 9:
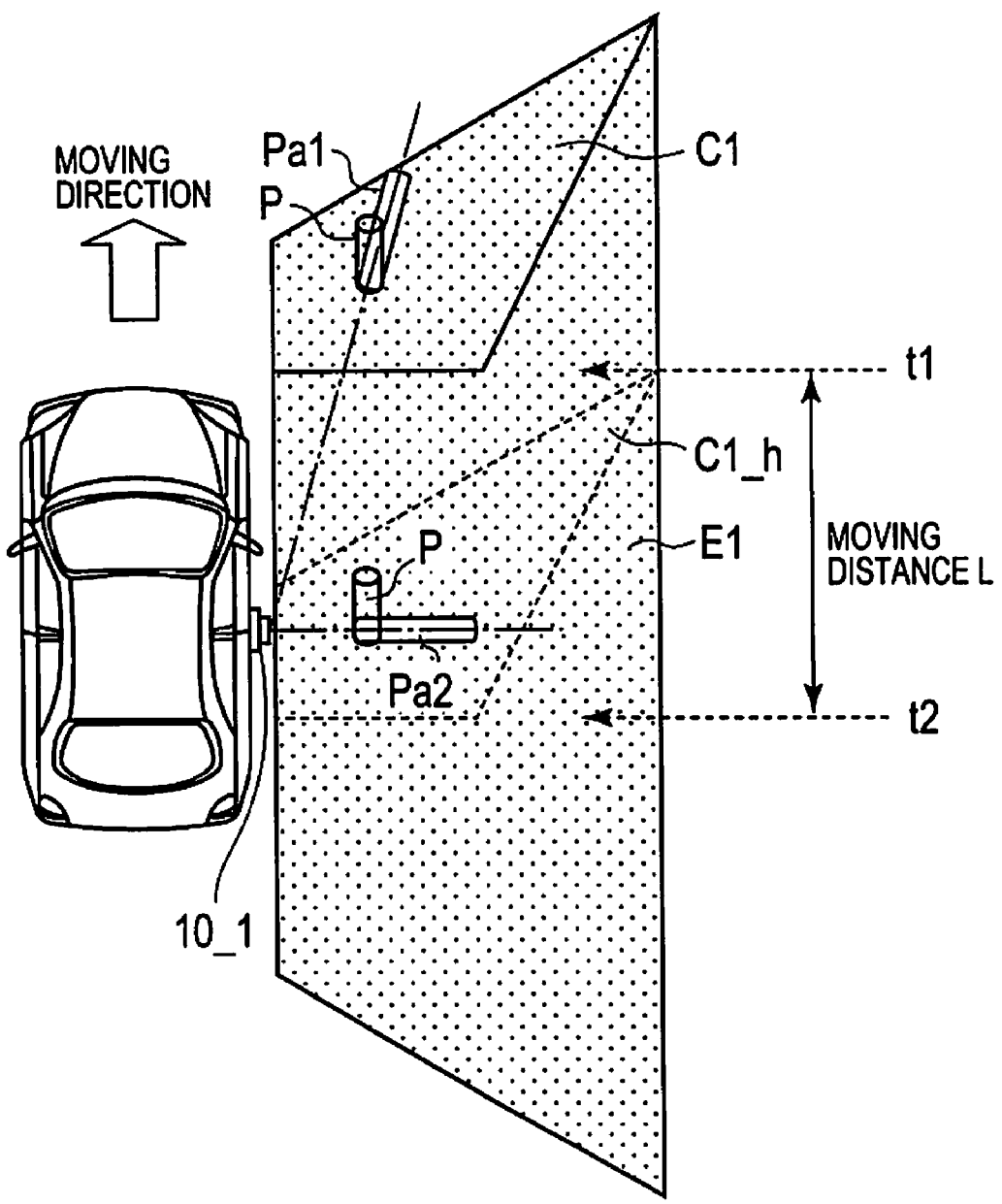
FIG. 9 shows an image obtained by overlapping projection images E1 captured at timing t1 and projection images E1 captured at timing t2 in the driving assistance system of the second embodiment.

Here, FIG. 9 is a view showing an image obtained by overlapping projection image E1 captured at timing t1 and projection image E1 captured at timing t2 by processor 100. For example, it is assumed that image Pa1 of solid object P such as a pole is included in an image corresponding to overlapping region C1 within projection image E1 captured by vehicle camera 10_1 at timing t1, and image Pa2 of solid object P is included within projection image E1 captured at timing t2. Based on the moving distance L acquired by moving distance obtaining unit 80, identifier 53 identifies comparison region C1_h corresponding to an overlapping region within projection image E1 of timing t1, within projection image E1 of timing t2. Further, determination unit 54 calculates a difference between an image corresponding to overlapping region C1 of timing t1, and an image of comparison region C1_h of timing t2. At this time, when there is solid objects P in the image of overlapping region C1 and the image of comparison region C1_h, image Pa1 and image Pa2 become different images, so that the difference to be calculated becomes large. Thus, determination unit 54 determines whether the calculated difference is not less than the threshold value, and thereby determines whether there is a solid object in overlapping region C1 or not.

Since operations of Steps S180 to S190 are the same as those of Steps S180 to S190 of the first embodiment, further descriptions thereof are omitted.

(Operation/Effect of Driving Assistance System of Second Embodiment)

In driving assistance system 1 of the this embodiment, in processor 100, solid object determination unit 50 determines whether there is a solid object in overlapping region C1 based on a difference between an image corresponding to overlapping region C1 within projection image E1 converted from a first image captured at timing t1, and an image corresponding to comparison region C1_h within projection image E1 converted from a first image captured at timing t2.

Here, for example, when a solid object is imaged by vehicle camera 10_1 mounted on a moving vehicle, imaging directions to the solid object at timings t1 and t2 are different. Accordingly, in the projection images including the solid object thus imaged, corresponding images of the solid object are not the same. Therefore, when there is a solid object in overlapping region C1, the difference between the image corresponding to overlapping region C1 and the image corresponding to comparison region C1_h becomes large.

Thus, in processor 100 described above, it is determined whether there is a solid object in overlapping region, and when it is determined that there is no solid object, a difference between an image corresponding to overlapping region C1 within projection image E1 of timing t1, and an image corresponding to overlapping region C2 within projection image E2 of timing t1 is calculated. Consequently, it is more accurately detected whether a vehicle camera has moved out of its proper position or not.

(Third Embodiment)
(Configuration of Driving Assistance System of Third Embodiment of Present Invention)

Figure 10:
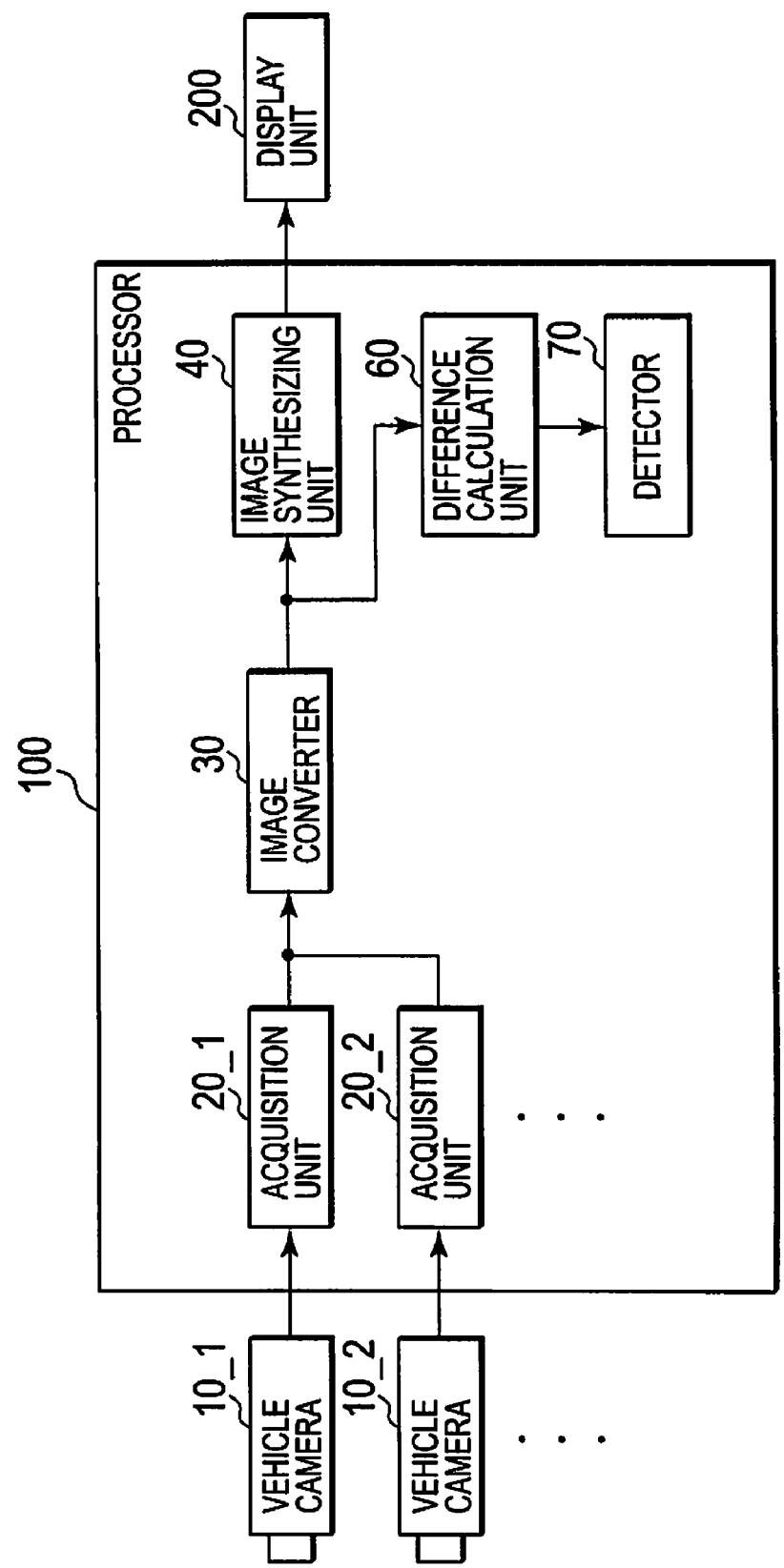
FIG. 10 is a block diagram showing a driving assistance system of a third embodiment.

A third embodiment of the present invention will be described with particular attention focused on points different from the first embodiment. FIG. 10 is a block diagram showing processor 100 (an image processor) of this embodiment. As shown in FIG. 10, processor 100 does not include solid object determination unit 50.

Further, difference calculator 60 of this embodiment calculates a difference between an image corresponding to overlapping region C1 within projection image E1, and an image corresponding to overlapping region C2 within projection image E2.

In addition, detector 70 of this embodiment detects that vehicle camera 10_1 or vehicle camera 10_2 has moved out of its proper position, based on the number of times that the difference calculated by difference calculator 60 consecutively takes a value not less than a threshold value.

To be more precise, detector 70 stores therein the number of times that the difference consecutively takes a value not less than a threshold value, as a count value. Further, when the stored count number reaches or exceeds a predetermined count number (the number of times) stored in advance, detector 70 detects that vehicle cameras 10_1 to 10_4 have moved out of their proper positions.

(Operation of Driving Assistance System of Third Embodiment)

Figure 11:
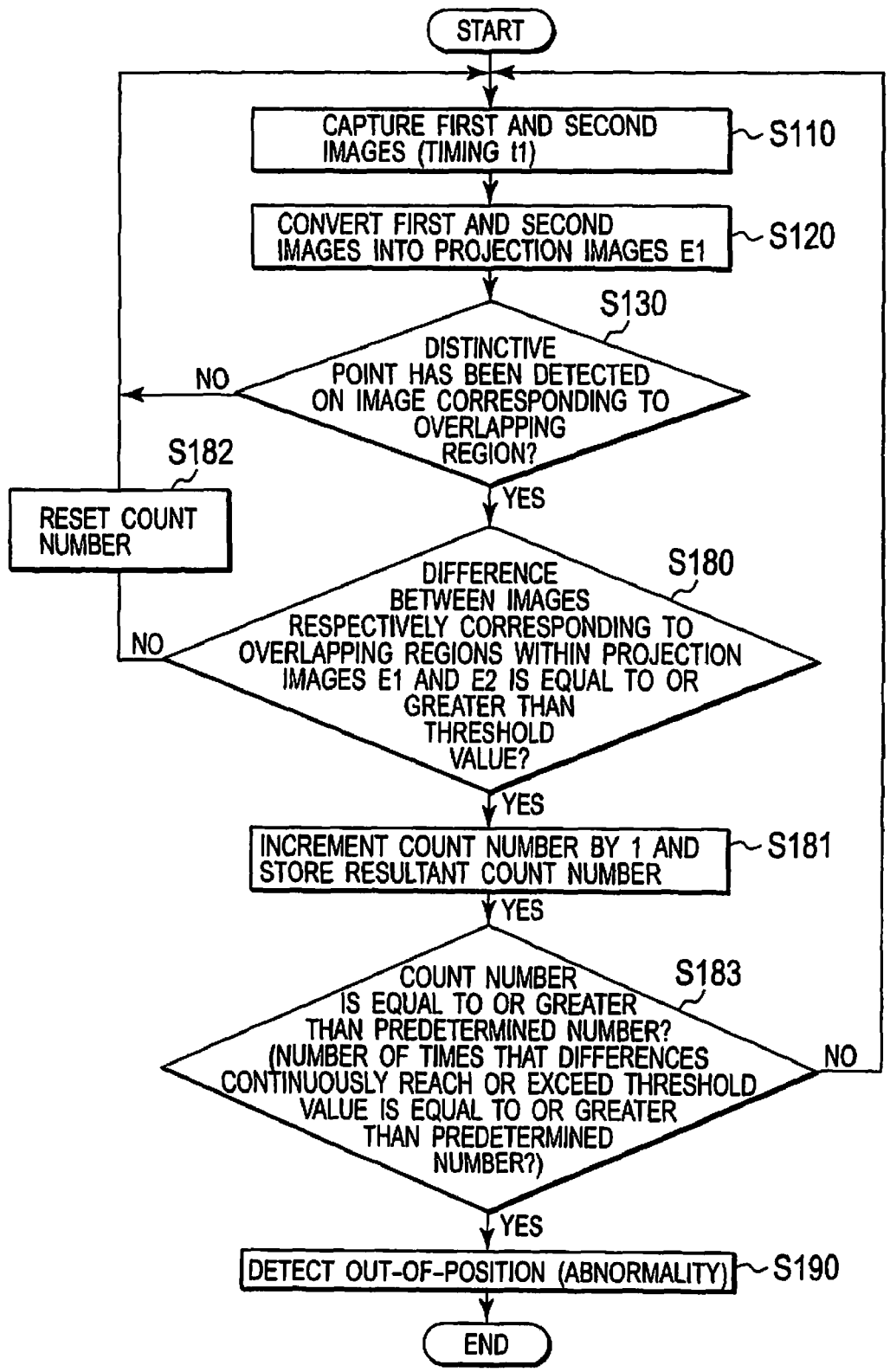
FIG. 11 is a flowchart showing operation of the driving assistance system of the third embodiment.
Figure 12:
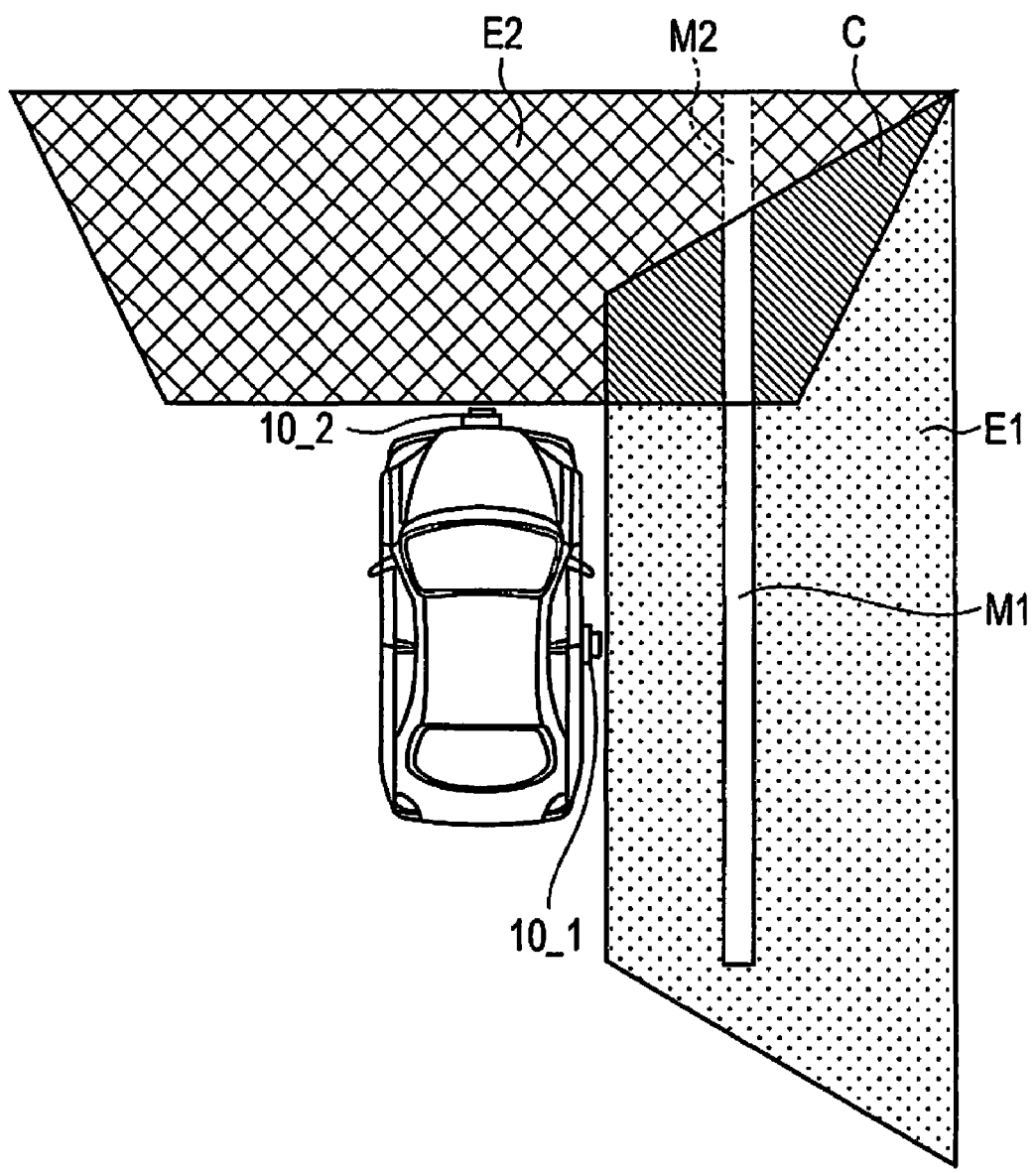
FIG. 12 shows an image formed by overlapping two projection images in a driving assistance system.
Figure 13:
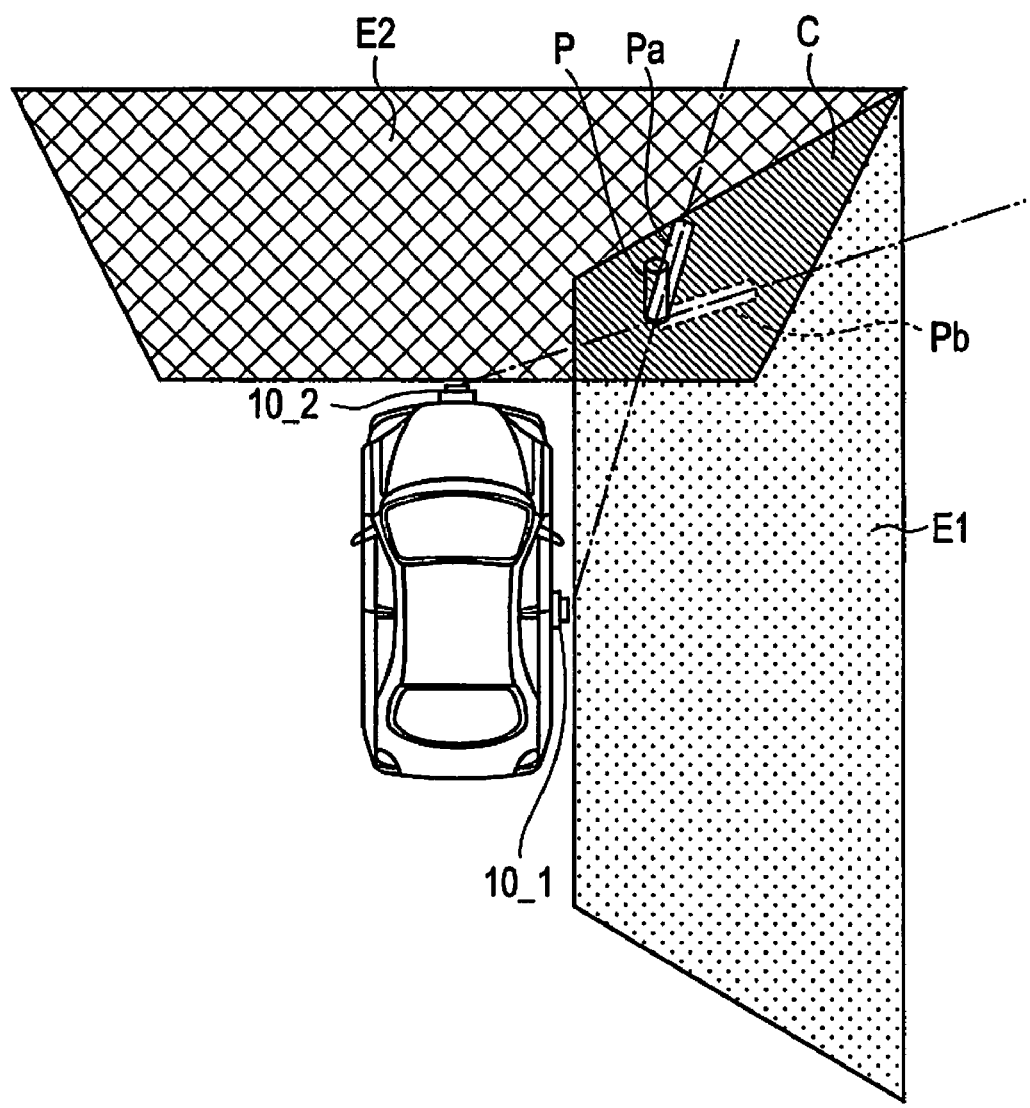
FIG. 13 shows an image formed by overlapping two projection images in a driving assistance system.

Operation of a driving assistance system 1 having the above-described configuration will be described. Specifically, referring to FIG. 11, control operation at the time when processor 100 performs a detection of out-of-position will be described. Here, the control operation will be described with reference to an example of operation in which it is detected whether vehicle camera 10_1 and vehicle camera 10_2 have moved out of their proper positions.

Here, since operations of Steps S110 to 130 are the same as those of Steps S110 to S130 of the first embodiment, further descriptions thereof are omitted.

In Step S180, difference calculator 60 calculates a difference between an image corresponding to overlapping region C1 within projection image E1, and an image corresponding to overlapping region C2 within projection image E2. Then, difference calculator determines whether the calculated difference is not less than a threshold value stored in advance or not. Thereafter, difference calculator 60 informs detector 70 of a result thus determined.

In Step S181, after informed from difference calculator 60 that the calculated difference is not less than the threshold value, detector 70 increments the count number by one, and stores the incremented count number.

In Step S182, when informed from difference calculator 60 that the calculated difference is less than the threshold value, detector 70 resets the count number to zero, and stores the reset count number.

In Step S183, detector 70 determines whether the incremented count number is not less than a predetermined count number stored in advance.

In Step S190, when detecting in Step S183 that the incremented count number is not less than the predetermined count number, detector 70 detects that vehicle camera 10_1 and vehicle camera 10_2 have moved out of their proper positions.

Operations of Steps S110 to S190 may be performed for each time images are captured by vehicle cameras 10_1 and 10_2, or may be performed, for example, at predetermined period intervals (e.g., one day). Further, when out-of-position is not detected (operation in Step S190) within a predetermined period (e.g., within one hour), the operation may be ceased.

(Operation/Effect of Driving Assistance System of Third Embodiment)

According to the feature of this embodiment, when detecting that the number of times that the difference calculated by difference calculator 60 consecutively reach or exceed a threshold value is not less than a predetermined count number, detector 70 detects that vehicle camera 10_1 and vehicle camera 10_2 have moved out of their proper positions.

Here, in the case where vehicle camera 10_1 and vehicle camera 10_2 have moved out of their proper positions, the difference between an image corresponding to overlapping region C1 within projection image E1, and an image corresponding to overlapping region C2 within projection image E2 takes a value not less than the threshold value regardless of how many times images are captured, i.e., the difference between the images takes a value not less than the threshold value each time. Further, when there is a solid object in overlapping region even though vehicle camera 10_1 and vehicle camera 10_2 have not moved out of their proper positions, that is, while there is a solid object, the difference between an image corresponding to overlapping region C1 within projection image E1, and an image corresponding to overlapping region C2 within projection image E2 takes a value not less than the threshold value. However, when the solid object disappears in overlapping region due to the moving of the vehicle, the difference becomes less than the threshold value.

In this manner, in the above-described driving assistance system, out-of-position detection is performed based on the number of times that the calculated difference consecutively takes a value not less than the threshold value, after it is detected whether there is a solid object in an overlapping region, or whether an vehicle camera has moved out of its proper position. Consequently, it is more accurately detected whether the vehicle camera has moved out of its proper position or not.

(Other Embodiment)

As described above, although the embodiments of the present invention have been disclosed in detail, it is not to be understood that the invention is limited by the description and accompanying drawings constituting part of the disclosure. The disclosure clearly enables those skilled in the art to carry out various other embodiments.

In the above-described embodiments, solid object determination unit 50 may be configured so that solid object determination unit 50 includes functions as an ultrasonic sonar, a millimeter-wave radar, a laser radar, an infrared radar, and using these functions, determines whether there is a solid object in an overlapping region. The present invention is applicable to various out-of-position detections for detecting vehicle camera of having moved out of its proper position, based on a difference between images on an overlapping region on which a plurality of projection images are projected, the projection images being obtained by projecting a plurality of captured images onto a plane.

Further, various combinations of the respective embodiments are also possible. On the operations and effects of the respective embodiments, only the most preferable ones which are produced from the present invention have been described, so the operations and effects of the present invention are not limited to the ones described in respective embodiments.

The invention includes other embodiments in addition to the above-described embodiments without departing from the spirit of the invention. The embodiments are to be considered in all respects as illustrative, and not restrictive. The scope of the invention is indicated by the appended claims rather than by the foregoing description. Hence, all configurations including the meaning and range within equivalent arrangements of the claims are intended to be embraced in the invention.

What is claimed is:

1. An image processor, comprising:
   a first vehicle camera and a second vehicle camera;
   an image converter configured to convert a first image into a first projection image projected on a plane and to convert a second image into a second projection image projected on a plane, the first image acquired by imaging a first target region around a vehicle captured with the first vehicle camera, the second image acquired by imaging a second target region captured with the second vehicle camera, wherein the second target region overlaps the first target region;
   an image synthesizer configured to synthesize an image from the first projection image and the second projection image;
   a solid object determination unit configured to detect a solid object in the overlapping region from the first projection image and the second projection image;
   a difference calculator configured to calculate, when the solid object determination unit detects the absence of a solid object, a difference between an image corresponding to the overlapping region within the first projection image, and an image corresponding to the overlapping region within the second projection image; and
   a detector configured to detect movement of at least the first vehicle camera or the second vehicle camera out of position by comparing between the calculated difference and a threshold value.

2. The image processor as claimed in claim 1,
   wherein the image synthesizer acquires first images from the first vehicle camera at a first and a second timing;
   the solid object determination unit comprises:
   a motion vector acquisition unit configured to acquire motion vectors based on an overlapping region image within the first projection image converted from the first image acquired at the first timing and the first projection image converted from the first image acquired at the second timing; and
   a motion vector determination unit configured to compare the motion vectors acquired by the motion vector acquisition unit, and to detect a solid object in the overlapping region.

3. The image processor as claimed in claim 2, wherein the motion vector acquisition unit detects discriminative points common to the image corresponding to the overlapping region within the first projection image acquired at the first timing, and to the first projection image converted from the first image acquired at the second timing, and acquires motion vectors based on the discriminative points.

4. The image processor as claimed in claim 3, wherein a discriminative point corresponds to a pixel at an edge region defined by having a large difference compared with that of surrounding pixels for each image corresponding to the overlapping region within the first projection image acquired at the first timing, and the first projection image converted from the first image acquired at the second timing, wherein a large difference is a difference indicating that a vehicle camera has moved out of a proper position.

5. The image processor as claimed in claim 2, wherein the motion vector determination unit receives the motion vectors, and determines whether differences in direction and length among the motion vectors are within tolerance values.

6. The image processor as claimed in claim 1,
   wherein the image synthesizer acquires the first images from the first vehicle camera at a first and a second timing;
   the image processor further comprises a moving distance obtaining unit configured to obtain a moving distance of a vehicle between the first timing and the second timing; and
   wherein the solid object determination unit further comprises:
   an identifier configured to identify a comparison region within the first projection image converted from the first image acquired at the second timing, based on the moving distance, wherein the comparison region corresponds to the overlapping region within the first projection image converted from the first image acquired at the first timing; and
   a determination unit configured to detect a solid object in the overlapping region, based on a difference between an image corresponding to the comparison region identified by the identifier, and an image corresponding to the overlapping region.

7. An image processor, comprising:
a first vehicle camera and a second vehicle camera;
an image converter configured to convert a first image into a first projection image projected on a plane, the first image acquired by imaging a first target region around a vehicle captured with a first vehicle camera, and to convert a second image into a second projection image projected on a plane, the second image acquired by imaging a second target region having a region that overlaps the first target region, the second image captured with a second vehicle camera;
an image synthesizer configured to generate a synthesis image from the first and second projection images;
a difference calculator configured to calculate a difference between images that correspond to the overlapping regions within the first and second projection images; and
a detector configured to detect movement of at least the first vehicle camera or the second vehicle camera out of position, based on the number of times that the difference calculated by the difference calculator consecutively is equal or greater to a threshold value.

8. A driving assistance system, comprising:
a first vehicle camera configured to image a first target region around a vehicle;
a first acquisition unit configured to acquire a first image imaged by the first vehicle camera;
a second vehicle camera configured to image a second target region around the vehicle; and
a second acquisition unit configured to acquire a second image imaged by the second vehicle camera;
an image converter configured to convert a first image into a first projection image projected on a plane and to convert a second image into a second projection image projected on a plane, the first image acquired by imaging a first target region around a vehicle captured with a first vehicle camera, the second image acquired by imaging a second target region captured with a second vehicle camera, wherein the second target region overlaps the first target region;
an image synthesizer configured to synthesize an image from the first projection image and the second projection image;
a solid object determination unit configured to detect a solid object in the overlapping region from the first projection image and the second projection image;
a difference calculator configured to calculate, when the solid object determination unit determines the absence of a solid object, a difference between an image corresponding to the overlapping region within the first projection image, and an image corresponding to the overlapping region within the second projection image; and
a detector configured to detect movement at least the first vehicle camera or the second vehicle camera out of position by comparing between the calculated difference and a threshold value.

9. An out-of-position detecting method, comprising:
converting a first image into a first projection image projected on a plane, the first image acquired by imaging a first target region around a vehicle from a first vehicle camera;
converting a second image into a second projection image projected on a plane, the second image acquired by imaging a second target region having a region that overlaps the first target region, from a second vehicle camera;
generating a synthesis image from the first and second projection images;
detecting a solid object in the overlapping region;
calculating, when no solid object is detected, a difference between an image corresponding to the overlapping region within the first projection image, and an image corresponding to the overlapping region within the second projection image; and
detecting movement of at least the first vehicle camera or the second vehicle camera out of position by comparing the calculated difference and a threshold value.

10. The method as claimed in claim 9, wherein the image synthesizer acquires the first images from the first vehicle camera at a first and a second timing; and
wherein the method of detection of a solid object in the overlapping region comprises:
acquiring motion vectors based on an image corresponding to the overlapping region within the first projection image converted from the first image acquired at a first timing and the first projection image converted from the first image acquired at the second timing; and
comparing the motion vectors to detect a solid object in the overlapping region.

11. The method as claimed in claim 10, wherein the acquiring motion vectors step comprises detecting discriminative points common to the image corresponding to the overlapping region within the first projection image acquired at the first timing, and the first projection image converted from the first image acquired at the second timing, and acquires motion vectors from the discriminative points.

12. The method as claimed in claim 11, wherein a discriminative point corresponds to a pixel at an edge region defined by having a large difference compared with that of surrounding pixels for each image corresponding to the overlapping region within the first projection image acquired at the first timing, and the first projection image converted from a first image acquired at the second timing.

13. The method as claimed in claim 10, wherein
the comparison of motion vector comprises receiving motion vectors, and comparing differences in direction and length between the motion vectors with tolerance values.

14. The method as claimed in claim 9, wherein
the image synthesis includes acquiring the first images from the first vehicle camera at a first and a second timing;
the method further comprises obtaining a moving distance of a vehicle between the first timing and the second timing; and
the detection of a solid object comprises:
identifying a comparison region within the first projection image converted from the first image acquired at the second timing, from the moved distance, the comparison region corresponding to the overlapping region within the first projection image converted from the first image acquired at the first timing; and
detecting a solid object in the overlapping region, from comparing an image corresponding to the comparison region identified by the identifier with an image corresponding to the overlapping region.

15. An out-of-position detecting method, comprising:

obtaining a first image of a first target region around a vehicle with a first vehicle camera, and converting the first image into a first projection image projected onto a plane;

obtaining a second image of a second overlapping target region around the vehicle with a second vehicle camera, and converting the second image into a second projection image projected on a plane, synthesizing the first projection image and the second projection image into a synthesis image;

comparing the overlapping regions of the first and second projection images to generate a calculated difference; and detecting movement of at least the first vehicle camera or the second vehicle camera out of position based on the number of times that the calculated difference is consecutively equal or greater to a threshold value.

* * * * *